United States Patent [19]

Villata

[11] Patent Number: 4,727,963
[45] Date of Patent: Mar. 1, 1988

[54] FRICTION COUPLING INCORPORATING WEAR COMPENSATING MEANS

[75] Inventor: Gino Villata, Buttigliera D'Asti, Italy

[73] Assignee: Valeo, Paris, France

[21] Appl. No.: 796,994

[22] Filed: Nov. 12, 1985

[30] Foreign Application Priority Data

Nov. 13, 1984 [FR] France ................ 84 17302

[51] Int. Cl.⁴ .......................................... F16D 65/56
[52] U.S. Cl. ........................... 188/71.9; 188/79.5 K;
188/196 D; 192/70.25; 192/111 A
[58] Field of Search ............... 188/71.9, 79.5 K, 199,
188/202, 196 D; 192/111 A, 70.25

[56] References Cited

U.S. PATENT DOCUMENTS

| 1,283,634 | 11/1918 | Beckman | 188/202 |
|---|---|---|---|
| 3,115,217 | 12/1963 | Butler | 188/71.9 |
| 3,326,329 | 6/1967 | Harrison | 188/71.9 |
| 3,901,357 | 8/1975 | Reitz et al. | 188/79.5 K |
| 3,921,765 | 11/1975 | Swander, Jr. | 188/79.5 K |
| 4,015,692 | 4/1977 | Mathews | 188/79.5 K |
| 4,019,612 | 4/1977 | Mathews et al. | 188/79.5 K X |
| 4,039,055 | 8/1977 | Meyer et al. | 188/79.5 K |
| 4,384,638 | 5/1983 | Crissy et al. | 188/79.5 K |
| 4,399,894 | 8/1983 | Tribe | 188/196 D X |
| 4,454,933 | 6/1984 | Hunnicutt et al. | 188/72.7 X |
| 4,478,317 | 10/1984 | Sheill | 188/71.9 |
| 4,522,286 | 6/1985 | Villata et al. | 188/72.7 |
| 4,598,801 | 7/1986 | Villata | 188/71.9 |

FOREIGN PATENT DOCUMENTS

| 0039479 | 11/1981 | European Pat. Off. . | |
|---|---|---|---|
| 2628206 | 1/1977 | Fed. Rep. of Germany . | |
| 2030689 | 11/1970 | France . | |
| 1152960 | 5/1969 | United Kingdom | 188/79.5 K |
| 1303127 | 1/1973 | United Kingdom . | |
| 1442562 | 7/1976 | United Kingdom | 188/71.9 |

Primary Examiner—George E. A. Halvosa
Attorney, Agent, or Firm—Young & Thompson

[57] ABSTRACT

A friction coupling incorporating wear compensating comprises friction members and a plunger adapted to extend in response to wear of the friction members. The extension of the plunger is controlled by the rotation in a predetermined direction of a rotating member housed in the plunger. On this member are engaged two one-way circumferentially-acting friction members, each consisting of at least two-thirds of a turn of a spring. One of these, connected to the plunger, is adapted to prevent rotation of the rotating member relative to the plunger when the latter moves forward. The other, coupled to a control member such as a lever, is adapted to drive the rotating member in rotation in the previously mentioned predetermined direction when the plunger moves back, if the previous forward movement of the plunger has exceeded a substantially constant set point value. A flexible part, linked to the friction member, absorbs forces applied by the control member when the plunger travel is less than a predetermined minimum level for activating wear compensation.

11 Claims, 7 Drawing Figures

FRICTION COUPLING INCORPORATING WEAR COMPENSATING MEANS

BACKGROUND OF THE INVENTION

1. Field of the invention

The present invention relates to a friction coupling incorporating wear compensating means, such as a brake in particular, comprising friction means and means for compensating wear thereof. The invention is more particularly concerned with the structure of these wear compensating means.

2. Brief description of the prior art

A coupling of this kind, designed to couple by friction a support to which it is connected to an external member which moves relative to the support, comprises, for the purpose of applying its friction means against said external member, a clamping member coupled to a plunger adapted to move forwards or backwards when acted on by a control member. The wear compensation principle consists in maintaining at a substantially constant value the forward-return travel of this clamping member whilst progressively moving it closer to the external member as and when the friction means wear. In practice the friction means are placed on either side of this exteral member so as to clamp it between them.

The invention applies particularly, but not exclusively, to disk brakes for which safety requirements are extremely severe since, even where these brakes are intended for use as parking brakes, they may also serve as emergency brakes. This makes it necessary to provide for automatic compensation of the wear of the friction facings of these brakes, which is not the case with drum brakes, in which the brake shoes do not wear as quickly.

Friction couplings incorporating wear compensating means are generally of complex and delicate construction.

It is to alleviate this disadvantage that there is proposed in US patent application Ser. No. 624,906 filed June 26, 1984, now U.S. Pat. No. 4,598,801 a simple, convenient and reliable coupling which comprises an extendable plunger the extension of which is controled by a ratchet wheel the pawl of which is coupled to the control member; this wheel acts on the extendable plunger through the intermediary of a transmission member which is connected respectively by three calibrated clamping force friction couplings to the ratchet wheel, to the pawl and to a part of the plunger so that this transmission member is immobile relative to said plunger part when the pawl moves independently of the ratchet wheel but is driven when the pawl and the ratchet wheel move together. This transmission member is in practice a shaft disposed transversely relative to the plunger, which controls the relative unscrewing, within the plunger, of a screw which is fixed axially and a nut which is prevented from rotating; the calibrated clamping force friction couplings are acted on by an axially acting spring calibration member, the axial direction being parallel to the transmission shaft; the forward-return travel of the clamping member, mounted at the forward end of the plunger, oscillates between two values the difference between which is defined by the length of the teeth on the ratchet wheel. Wear compensation is thus discontinuous.

European patent application No. 0039479 described a wear compensating system in a brake in which extension of the plunger is controlled via two springs mounted coaxially with said plunger. However, the arrangement is such that the two springs operate simultaneously, with the intention of limiting the torque, so that any compensation of wear is effected on the forward braking stroke.

An objective of the present invention is a friction coupling incorporating wear compensating means which, whilst being simple, convenient and reliable, is adapted to provide continuous wear compensation during the return braking stroke, using the minimum number of components.

SUMMARY OF THE INVENTION

The present invention consists of a friction coupling incorporating wear compensating means and adapted to couple a yoke member to which it is attached to an external member, comprising friction means adapted to bear selectively against said external member, an extendable plunger, a control member adapted to operate said extendable plunger, a clamping member linked to said extendable plunger, a device for compensating wear in said friction means adapted to maintain substantially constant the forward and return travel of said clamping member, a rotary member in said plunger, a system of gears whereby said plunger is coupled to said rotary member, and a mechanism linking said rotary member to said control member and comprising two circumferentially-acting friction members, each of which is single-acting and acts in the circumferential direction opposite that in which the other acts, one of which friction members is linked to said plunger and mounted on said rotary member in a position tending to prevent it rotating relative to said plunger during a forward stroke thereof and the other of which friction members is linked to said control member and is mounted on said rotary member in a position tending to rotate it during a return stroke of said plunger in a direction tending to extend said plunger, said mechanism further comprising means for absorbing forces applied by said control member when the travel of said plunger is below a specified value.

In order to absorb the forces applied by the control member when the braking travel is normal, the aforementioned mechanism may comprise a flexible member and/or a functional clearance in its connection to the plunger.

It will be noted that given the friction driving of the rotary member by the control member without the intermediary of any ratchet wheel the invention provides for continuous compensation of wear; also, the invention requires the use of only two friction connections by virtue of the single-acting and circumferentially-acting nature thereof; it will be noted that the friction action of these means results from a radial clamping phenomenon.

The invention provides that the single-acting circumferentially-acting friction means each comprise at least two-thirds of a turn of a spring which surrounds the rotary body and rotates it, where necessary, by gripping it. In practice, these circumferentially-acting friction means may have opposite unidirectional effects although having turns wound in the same direction.

In accordance with one advantageous embodiment of the invention the rotary member comprises a rotating shaft adapted to control extension of the plunger and a bush sliding on this shaft, over which are engaged the single-acting circumferentially-acting friction means, and which is coupled in rotation to this rotating shaft by single-acting circumferentially-acting friction means coupled to the bush and engaged on said shaft, adapted to transmit to this shaft only torque tending to cause it to rotate in said predetermined direction of rotation (and vice versa). These circumferentially-acting friction means advantageously comprise, as previously, at least two-thirds of a turn of a spring wound round the rotating shaft. A single-acting connection of this kind between the bush and the rotating shaft protects the various wear compensating parts in the event of excessive forces to which the rotating shaft in particular may be subjected. It will be noted that this connection also provides for manual adjustment of the angular position of said rotating shaft, during replacement of the friction means, for example, during the course of which the plunger has to be shortened.

It should be noted that, as in the previously proposed solution already referred to, the compensation of wear takes place not in the main mechanical system controlling the plunger, but in a subsidiary mechanical system in which the forces deployed are much lower (1,000 times lower, for example), since this system is used only by the wear compensating system and not for transmitting clamping forces. Also, if the wear compensating means were to fail, this would not prevent the friction coupling functioning, at least temporarily.

Other objects, characteristics and advantages of the invention will emerge from the following description given by way of non-limiting example with reference to the appended drawings.

DESCRIPTION OF THE PREFERRED EMBODIMENT

Figure 1:
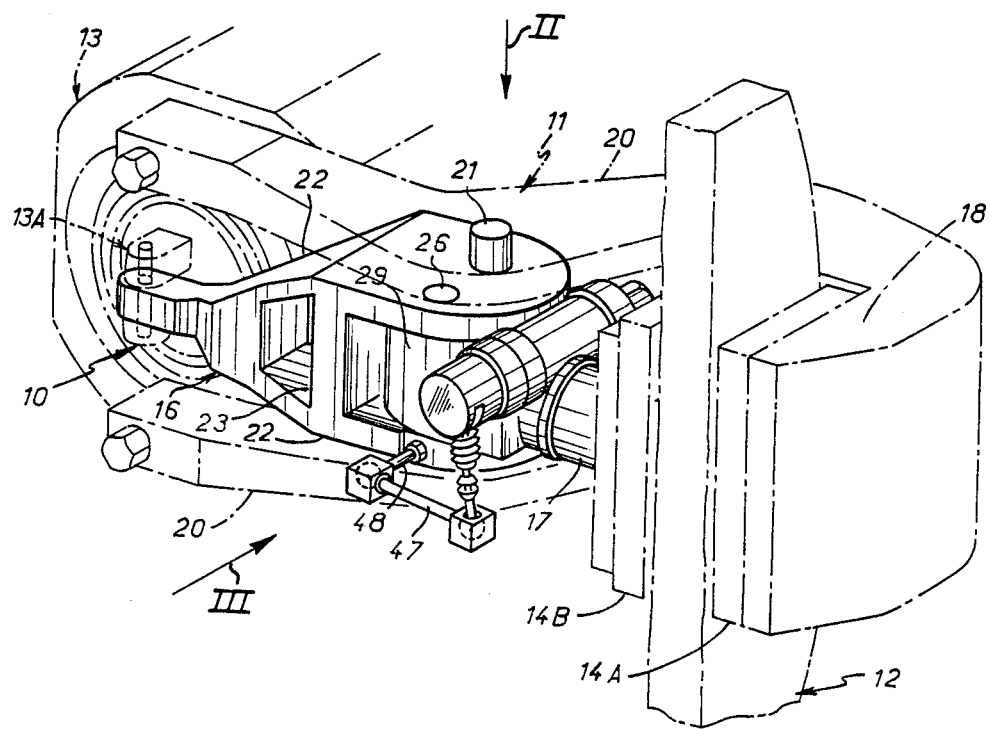
FIG. 1 is a side view in perspective of a friction coupling in accordance with the invention.
Figure 2:
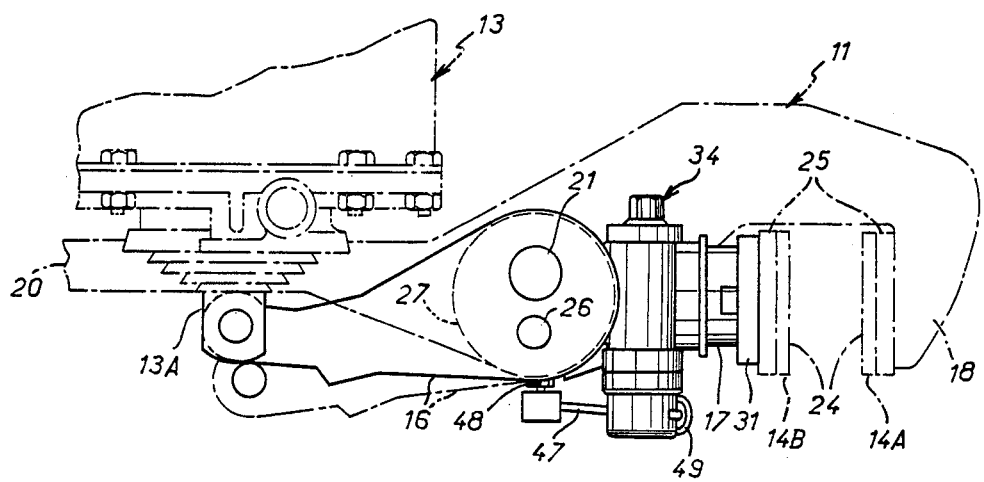
FIG. 2 is a side view of it in the direction of the arrow II in FIG. 1.
Figure 3:
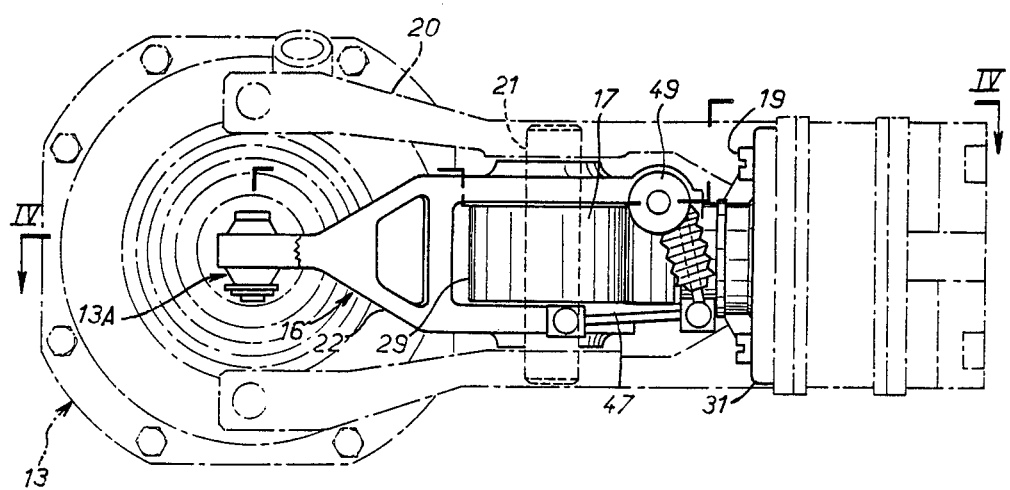
FIG. 3 is a view of it from below in the direction of the arrow III in FIG. 1.

The embodiment shown in FIGS. 1 through 7 relates, by way of non-limiting example, to an application of the invention to a parking disk brake, especially for an automobile vehicle. The mechanical brake control system incorporates a wear compensating device.

This disk brake comprises a friction coupling 10 comprising a support consisting of a yoke member 11 and a disk 12 designed to be coupled selectively to said yoke member when acted on by a control device 13 such as a hydraulic cylinder, for example, itself controled by a handbrake lever accessible to the driver of the vehicle. It will be understood that, with regard to the use of the term coupling, this coupling 10 has the function of coupling the disk to the yoke member 11, that is to say of immobilizing it.

The friction coupling 10 comprises friction members 14A and 14B consisting of brake pads adapted to be applied to either side of the disk 12 on friction tracks provided thereon.

This coupling principally comprises a yoke member 11, a lever 16 forming a control member and a plunger 17. The yoke member 11 comprises a bearing surface 18 adapted to receive the brake pad 14A, by means of a screw 19, for example (see FIGS. 4 and 5) and two arms 20 disposed one on either side of the lever 16 and the plunger 17, interconected by a shaft 21. The control lever 16 comprises two branches 22 connected by a transverse flange 23; these branches feature two parallel portions, through which the shaft 21 passes in the vicinity of their free ends, and two convergent portions merging at a common end coupled to a deployable part 13A of the control device 13. The plunger 17 is engaged on the shaft 21, in a way to be described in more detail hereinafter, and carries at its end the pad 14B disposed facing the pad 14A. These pads in practice comprise a friction facing 24 designed to cooperate with the disk 12 and which is attached, as by bonding, for example, to a support plate 25 adapted to be detachably fixed either to the yoke member 11 or to the flange 31 of the plunger 17.

For reasons of clarity the control device 13, the yoke member 11, the disk 12 and the brake pads 14A and 14B are shown schematically in FIG. 1, in chain-dotted outline, so as to show better the lever 16 and the plunger 17.

Figure 4:
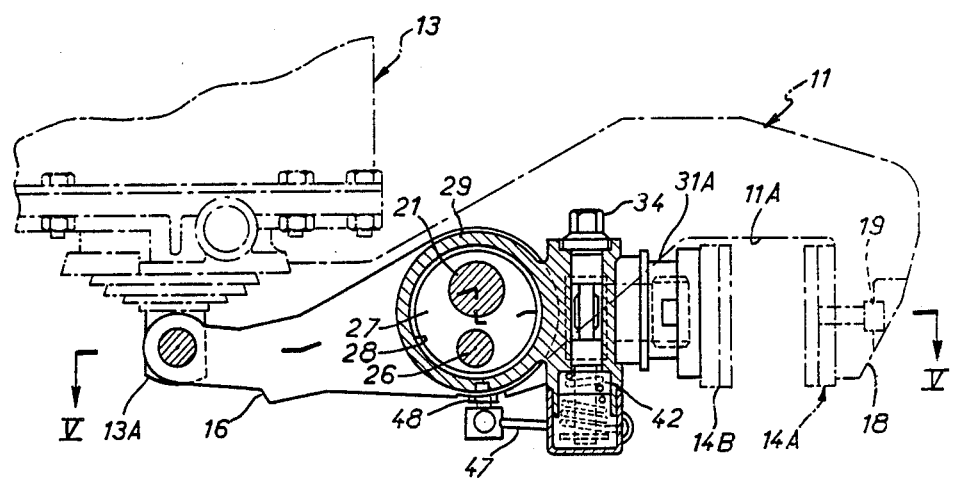
FIG. 4 is a view of it in partial crosssection on the broken line IV—IV in FIG. 3.
Figure 5:
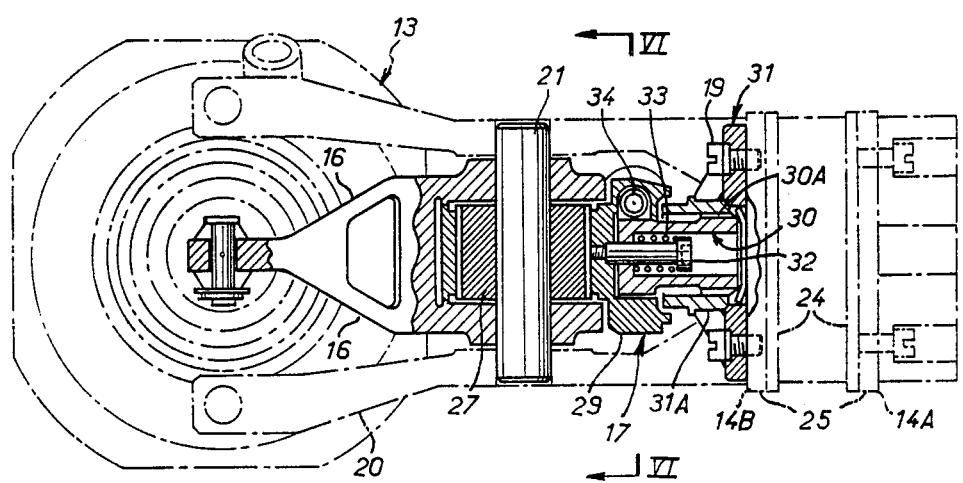
FIG. 5 is another view of it in partial crosssection, on the broken line V—V in FIG. 4.

The way in which the plunger 17 is articulated to the shaft 21 and to the lever 16 is more particularly shown in FIGS. 1, 4 and 5. The lever 16 comprises a supplementary shaft 26 over which is engaged, as over the shaft 21, a cylindrical mass 27 the axis of which, disposed perpendicularly to the plunger 17, is disposed between these shafts. This mass 27 is slidably engaged within an opening 28 in the plunger. Thus, when in FIG. 4 the deployable part 13A of the control device is pushed down, it causes the lever 16 to pivot around the shaft 21. Through the intermediary of the supplementary shaft 26, this lever causes eccentric rotation of the mass 27 around the shaft 21 which brings about a movement towards the right of the axis of this mass; the result is a translation towards the right of the plunger 17.

As seen in FIG. 5 in particular, the plunger principally comprises three parts: a plunger body 29 in which is formed the opening 28 in which is disposed the mass 27, a cylinder 30 and a flange 31 to which the brake pad 14B is fixed. Although it is free to rotate, the cylinder 30 is axially coupled to the plunger body 29, for example by a screw 32 engaged at its end in the plunger body, surrounded by a tubular guide sleeve and by elastic clamping means 33 urging the bottom of the hollow cylinder 30 axially against the plunger body 29. This cylinder is externally threaded near its free end 30A to form a screw and is engaged in an internally threaded sleeve 31A fastened to the flange 31 and forming a nut. This generally rectangular flange is unrestricted in the axial direction but prevented from rotating through cooperation of one of its edges 31A with a bearing and guide surface 11A formed on the yoke member 11.

It is readily understood that relative rotation between the cylinder 30 and the plunger body 29, and therefore the flange 31, causes relative screwing or unscrewing of the cylinder and the flange, varying the overall length of the plunger. Thus the plunger is extendable.

The rotation of the cylinder 30 is controlled by wear compensating means to be defined hereinafter so that the flange 31 moves on average towards the bearing surface 18 of the yoke member as and when the facings 24 of the pads (and also, to a lesser extent, the friction tracks on the disk 12) become worn, so that this flange, which controls the clamping of the friction means, retains between a clamping configuration and an inactive configuration a substantially constant forward-return stroke.

The cylinder 30 is rotated by a lead screw 34 retained substantially fixed in the axial direction in a housing 35 (FIGS. 6, 7) formed transversely in the body of the plunger 29 featuring over part of its length a thread 36 adapted to cooperate with splines 37 formed on the outside surface of the end of the cylinder 30 axially opposite the threaded end 30A.

Figure 6:
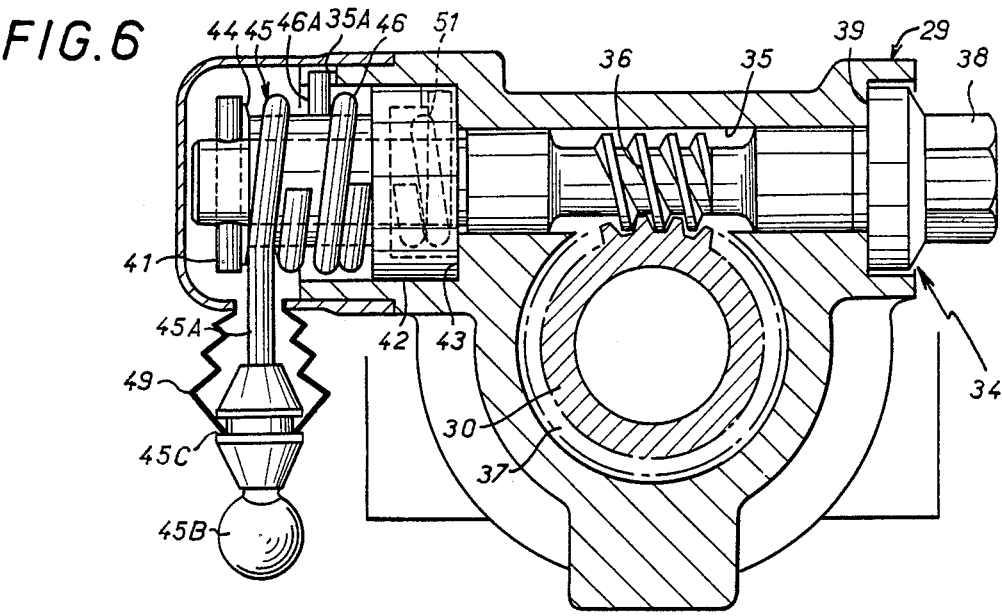
FIG. 6 is a partial view of it to a larger scale in transverse cross-section on the line VI—VI in FIG. 4.
Figure 7:
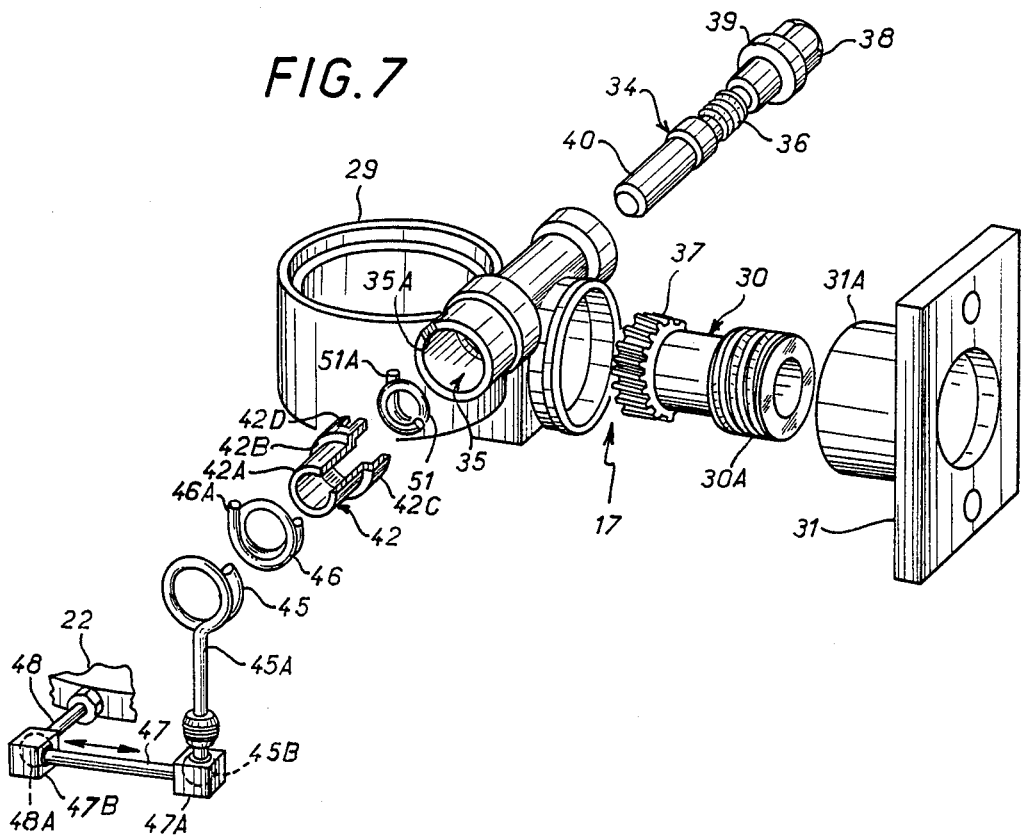
FIG. 7 is an exploded view in perspective of a detail from FIG. 6.

The lead screw 34 as shown in FIGS. 6 and 7 principally comprises a hexagonal head 38, an axial bearing coller 39 designed to cooperate with the plunger body, the aforementioned threaded section 36, and a cylindrical portion 40 through the end of which passes a diametral bore designed to accommodate a transverse locking pin 41. The cylindrical portion 40 is advantageously adapted to be slidably engaged in a bush 42 having a body 42A bordered by a transverse flange 42B, itself extended by a tubular portion 42C adapted to delimit an annular volume around the cylindrical portion 40 of the lead screw 34. The housing 35 formed in the plunger body features a widened part to accommodate the bush, delimited by a transverse bearing surface 43 adapted to have the edge of the tubular portion 42C bear on it. When the lead screw 34 and the bush 42 are engaged in the plunger body, an axial compression elastic member 44, such as a Belleville spring washer, is advantageously disposed between the edge of the body 42A of the bush and the transverse locking pin 41 so as to permit the lead screw to move slightly in the axial direction and to absorb the axial tolerances of the parts.

On the body 42A of the bush are engaged two single-acting circumferentially-acting friction members which act in oppposite directions, one of which (45) is coupled to the control lever and the other of which (46) is coupled to the plunger body.

As shown in first of these members 45 comprises at least two-thirds of a turn of a spring wound around the body of the bush 42. It comprises a portion 45A which diverges from the lead screw 34 in a direction substantially parallel to the shaft 21 and which terminates in a ball 45B engaged in a cavity formed in a block 47A carried by a link 47 which carries at its other end a block 47B in a cavity in which is engaged a ball 48A carried by a link 48 anchored by its other end to one of the arms 22 of the control lever 16. The link 47 is oriented substantially parallel to the axis of the plunger and the link 48 is substantially at right angles to the link 47 and to the part 45A of the circumferentially-acting friction member 45.

The second of the circumferentially-acting friction members 46 likewise comprises at least two-thirds of a turn of a spring wound around the body 42A of the bush. It has an end 46A which diverges from said body 42A and which is adapted to be engaged in a notch 35A formed axially at the entry to the widened part of the housing 35 receiving the bush 42 and the lead screw 34. As shown here, the turns of the circumferentially-acting friction members 45 and 46 are wound in the same sense.

In practice the circumferentially-acting friction members 45 and 46 are protected by an elastic gaiter 49 which is mounted on the bearing surface 35 of the plunger 29 and which clips over a housing 45C on the member 45 (see FIG. 6).

Another circumferentially-acting friction member, in this example of the single-acting type, is advantageously engaged over the lead screw 34 and coupled to the bush. This member preferably comprises at least two-thirds of a turn of a spring wound around the screw 34 and of which one end 51A is engaged in a notch 42D formed axially in the tubular part 42C of the bush. As shown here this turn is wound in the direction opposite to that of the turns of the members 45 and 46. The function of this member 51 is to prevent the lead screw being subjected to excessive torque by the bush; it also permits rotation of the lead screw 34 during manual adjustment of its angular position, notably after replacement of the brake pads 14A and 14B, by action on its hexagonal head 38.

In operation during a braking phase, when the forward travel of the plunger is at its set point value (a few tenths of a millimeter in practice), the pivoting of the control lever transmitted by the links 47 and 48 is taken up by elastic bending of the part 45A of the member 45 and by any circumferential clearance there may be between the end 46A of the member 46 and the notch 35A which accommodates it. There is no wear to be compensated.

However, if because of wear the forward travel of the plunger exceeds its set point value, the pivoting of the control lever brings about, in addition to bending of the part 45A of the member 45, an unwinding of the associated spring turn (by virtue of its winding direction), which causes angular slipping of this turn relative to this bush. By virtue of its winding direction, the spring turn of the member 46 tends to grip the bush and prevents any rotation of it due to the action of the member 45. During the subsequent phase of releasing the brake, the member 45 tends to grip the bush and to make it turn (clockwise in FIG. 7), which rotation the member 46 tends not to oppose by virtue of the fact that it tends to open out the spring turn. This rotation of the bush tends to accentuate the clamping effect of the member 51 on the lead screw 34 which is thus driven in its turn and which can thus bring about rotation of the cylinder 30 so as to extend the plunger. It may be verified that if by action on the hexagonal head the lead screw 34 were to be turned anticlockwise the member 51 would oppose only limited resistance whereas any excessive torque applied by the bush to this member would cause it to slip on the screw 34 which would then oppose a higher resistance to the friction applied by the member 51 which thus acts as a friction torque limiter.

In practice the torque applied by the member 45 is greater than the sum of the torque applied by the member 46 when it releases its grip and the various friction forces in the mechanical transmission system.

Compensating wear by rotating the cylinder 30 is not always possible immediately. It is then beneficial for the axial compression member 48 to enable the screw 34 to turn when acted on by the member 41, describing a helical movement. The compression of the elastic member 44 then, so to speak, memorizes the rotation which will have to be applied to the cylinder 30 as soon as this becomes possible, during the course of one or more brake application-release phases.

It goes without saying that the preceding desription has been given by way of non-limiting example only and that numerous variations may be put forward by the man skilled in the art without departing from the scope of the invention. Thus, in particular, the rotary member consisting of the lead screw and the bush might as an alternative be replaced by a single part, or the connection between the bush and the lead screw might be modified structurally. The numbers of turns of the members 45 and 46 may be modified, and they may even lend themselves to numerous structural variations; by way of one variation, for example, they might be engaged in a tubular part of the bush; as another variation, friction might be operative between the members 45 and 46 and the control member and the plunger, respectively. The direction of winding the turns, when the members 45 and 46 comprise same, may vary from one member to the other (according to the arm 22 to which the link 48 is attached, for example). The clamping member of the friction means is not always carried by the forward end of the plunger: a more complex mechanical connection might be preferred in certain cases.

I claim:

1. A friction coupling comprising a yoke member accommodating friction means arranged for selective engagement with an external member, a control member for controlling the selective engagement of a said friction means with such an external member, an extendable plunger, said control member being cooperable with said extendable plunger, a clamping member carrying said friction means and linked to said extendable plunger, means for compensating wear in said friction means adapted to maintain substantially constant forward and return travel of said clamping member, said means for compensating wear comprising a rotary member mounted in said plunger, gear means providing meshing engagement between said plunger and said rotary member, and a mechanism linking said rotary member to said control member and comprising two one-way circumferentially-acting friction members, each of said friction members acting in a single circumferential direction opposite that of the other friction member, one of said friction members being linked to said plunger and mounted on said rotary member in a position tending to prevent it rotating relative to said plunger during a forward stroke thereof and the other of said friction members being linked to said control member and mounted on said rotary member in a position tending to rotate it during a return stroke of said plunger in a direction tending to extend said plunger, said mechanism further comprising means for absorbing forces applied by said control member when the travel of said plunger is below a specified value, said means for absorbing forces comprising a flexible part integral with one of said friction members, said rotary member comprising a lead screw adapted to control extension of said plunger and a bush that slides on said lead screw and cooperates with said circumferentially-acting friction members; a third circumferentially-acting friction member between said lead screw and said bush operable in a single circumferential direction so as to transmit rotational torque from said bush to said lead screw and to limit the torque transmission.

2. Coupling according to claim 1, wherein each circumferentially-acting friction member comprises at least two-thirds of a turn of a spring wound round said rotary member.

3. Coupling according to claim 2, wherein said spring turns of both of said two one-way friction members are wound in the same direction.

4. Coupling according to claim 2, wherein said plunger features a notch in which the end of one circumferentially-acting friction member is engaged.

5. Coupling according to claim 4, wherein said control member comprises a lever mounted to pivot on a shaft and said flexible part is coupled at a free end to said lever.

6. Coupling according to claim 1, wherein said third circumferentially-acting friction member comprises at least two-thirds of a turn of a spring wound round said lead screw and said bush comprises a notch in which one end of said third circumferentially-acting friction member is engaged.

7. Coupling according to claim 1, further comprising an elastic compression member and wherein said lead screw is movable axially against the action of said elastic compression member.

8. A friction coupling according to claim 1, wherein said flexible part is integral with said other friction member.

9. A friction coupling according to claim 1, wherein said friction members are wound springs and the flexible part is a substantially straight section of the wound spring defining said other friction member.

10. A friction coupling according to claim 1, wherein said control member is pivotally mounted about an axis, said flexible part being substantially parallel to said shaft.

11. A friction coupling according to claim 1, wherein said plunger comprises a body accommodating said rotary member for rotation, a cylinder, said gear means being partly defined on said cylinder, said cylinder having a threaded portion in threaded engagement with a nut member defining said clamping member, said cylinder being rotatable relative to the plunger body but axially coupled thereto, said nut member being axially movable but restrained against rotational movement.

* * * * *